United States Patent Office

3,770,772
Patented Nov. 6, 1973

3,770,772
HYDROGENATION PROCESS
Wolfram R. Kroll, Somerville, N.J., assignor to Esso Research and Engineering Company
No Drawing. Filed Nov. 3, 1969, Ser. No. 873,489
Int. Cl. C07d 65/02
U.S. Cl. 260—332.1                 2 Claims

ABSTRACT OF THE DISCLOSURE

Sulfolene and alkyl substituted sulfolenes may be hydrogenated to sulfolanes and alkyl substituted sulfolane by utilizing a hydrogenation catalyst prepared by the reaction of organoaluminum or organoaluminum monoalkoxide reducing agents with transition metal salts in the presence of a solvent; such catalyst may be further activated by the addition of Lewis base or weak organic acids. In a preferred embodiment the catalyst is rendered insoluble in the solvent by oxygenation, preferably with air, and then removed by conventional filtration, centrifugation or decantation.

BACKGROUND OF THE INVENTION

The hydrogenation of sulfolene and sulfolene derivatives such as alkyl substituted sulfolenes, preferably methyl sulfolene has in the past been extremely difficult to achieve. The difficulty has centered around a number of facts. First, the $SO_2$ group tends to poison a number of conventional catalyst for low temperature operation so that relatively high temperatures and pressures are required. Additionally, the sulfolene is thermally instable and decomposes to $SO_2$ and butadiene readily at temperatures above 100° F. One way of avoiding this decomposition is to work at relatively high pressure. This is obviously quite expensive from a viewpoint of capital investment for a new plant. Since sulfolene is used on a large scale in petrochemical plants as a chemical for the extraction of aromatics, an economical process is needed. Currently, it is commercially produced by hydrogenating sulfolene using conventional heterogeneous catalyst; no homogeneous catalysts is known which can hydrogenate sulfolene. The disadvantages of using a heterogeneous catalyst for this purpose are that it requires high operating pressure e.g. 1000 lbs. and the catalyst efficiency is quite low.

In U.S. Pat. 3,412,174 a hydrogenation catalyst is disclosed which is prepared by the reaction of organoaluminum or organoaluminum monoalkoxide reducing agents with transition metal salts; this catalyst may be further activated by the addition of Lewis bases or weak organic acids. Within the patent is a broad disclosure which defines the catalyst and its use in hydrogenation, particularly its use in hydrogenating carbon-carbon unsaturation. There is, however, within this specification no teaching of the detrimetnal effects that $SO_2$, such as that found in sulfolane or sulfolene, would have on the catalyst.

SUMMARY OF THE INSTANT INVENTION

According to this invention it has been found that a homogeneous catalyst which is prepared by the reaction of an organoaluminum or an organoaluminum monoalkoxide reducing agent with transition metal salts may be used to hydrogenate sulfonene and its alkyl derivatives such as methyl sulfolene without a significant deactivation problem. Sulfolene in particular may be hydrogenated to sulfolane with extremely good catalyst life at substantially ambient temperature and low pressures, i.e. <300 lbs.

In a preferred embodiment the sulfolane is recovered from the soluble catalyst after hydrogenation. This is accomplished by bubbling an oxygen-containing gas, preferably air, through the solution and thereby oxygenating the catalyst. The oxygenated catalyst unexpectedly is insoluble and may be removed by filtration, centrifugation or decantation. Of course, other methods of catalyst removal can be used, e.g. distillation of the product from the less volatile catalyst or an aqueous washing step followed by benzene extraction to recover the sulfolane.

In more detail, this invention will be utilized to hydrogenate sulfolene and alkyl substituted sulfolenes which would include the various methyl sulfolenes. Sulfolene or methylsulfolene is contacted with the catalyst described herein; the catalyst is a combination of the reaction product of an organoaluminum or organoaluminum monoalkoxide reducing agent with a transition metal salt. In certain cases, the catalyst may be further activated by the addition of a Lewis base or weak organic acids. Sulfolene and sulfolane may both be regarded as Lewis bases for this catalyst. The hydrogenation can be carried out in sulfolene or sulfolane as solvent or co-solvent. Generally mixtures of sulfolene/sulfolane and substantially inert aromatics, i.e. benzene are preferred as solvent.

The metal salts or compounds reduced to form the catalyst system are transition metal salts or compounds. Thus, metals selected from each Groups I–B through VIII–B of the Periodic Chart of the Elements can be successfully employed. Preferred metals are those having an atomic number greater than 20 and less than 76. Some preferred metals are: titanium, vanadium, chromium, manganese, iron, cobalt, nickel, which have an atomic number greater than 20 and less than 30, copper, along with Group VIII noble metals, e.g. platinum and rhodium. Particularly preferred, however, are iron, cobalt, nickel, which elements have an atomic number greater than 25 and less than 29, and platinum, while nickel and cobalt, especially cobalt, are the most desirable.

The selection of the anionic component of the transition metal salt or compound is not critical and both organic as well as inorganic components may be employed. Typical examples of inorganic radicals that may be employed are halides, e.g. chlorides, bromides, $SiF_6^-$, cyanides, azides, etc. However, organic radicals, such as acetates and naphthenates, are preferred anionic components because of their excellent solubility and drying characteristics. A particularly preferred organic component is the chelate, e.g. the β-diketonate, due to its excellent solubility and ready availability. A preferred β-diketonate is the acetylacetonate. Of course, other chelates such as dimethylgloxime derivatives, tropolonates, or salicylaldehydes, etc. can also be utilized. Other organic components that may be employed are the salts of organic acids, e.g. acetates, propionates, butyrates, valerates, etc. stearate, laurates, oleates, and other fatty acid salts, also salts of alcohols such as butanols, hexnols, octanols, glycols, eicosanols, cyclododecanol, etc. and alkoxides, e.g. ethoxides, benzoates, carbonates, acetylacetonates, and the like. The transition metal compound can be a metal salt and may be desecribed as: a salt of an acidic organic compound in which the organic acid has a pKa in the range of 1–2; may be a carboxylic acid of pKa less than 9; from 1–25 carbon atoms; from 1–2 acidic hydrogen atoms; and can be monobasic with a solubility in benzene in parts per 100 parts at 25° C. of at least 0.1 part.

The selection of a reducing agent is an important feature of this invention since it may affect the activity of the catalyst system. Generally, Group I to Group III organometallic compounds can be employed, i.e. aluminum, sodium, etc. However, organoaluminum or organomagnesium compounds are preferred, particularly the organoaluminum compounds. Thus, this invention will now be discussed with reference to organoaluminum compounds, bearing in mind that the other organometallics will operate similarly. The organoaluminum reducing agents can be represented by the following formulae:

(I) $AlR_2OR$ (II) $AlR'_3$ wherein in Formula I R is a $C_1$-$C_{20}$ hydrocarbyl radical, preferably selected from the group consisting of $C_1$-$C_{20}$ alkyl, e.g. ethyl, propyl, isopropyl, butyl, isobutyl, pentyl, hexyl, heptyl, octyl, etc. both iso- and normal; cycloalkyl, e.g. cyclopentyl, cyclohexyl, cyclopentadienyl; aryl, e.g. phenyl, naphthyl; and alkaryl, e.g. benzyl and is preferably $C_2$-$C_{20}$ hydrocarbyl and more preferably $C_2$-$C_4$ alkyl. In Formula II R' may be selected from the group consisting of hydrogen, halogen, and $C_1$-$C_{20}$ hydrocarbyl and at least one R' is hydrocarbyl, and the hydrocarbyl radicals are preferably as fully described above for Formula I. Although these reducing agents can be used interchangeably in many reactions, it is often preferably to employ the reducing agent shown in Formula I, hereinafter referred to as the monoalkoxide reducing agent. Typical examples of the reducing agents that may be employed are: $(C_2H_5)_2AlO(n-C_4H_9)$, $Al(i-C_4H_9)_3$, $Al(C_2H_5)_3$, $Al(C_3H_7)_3$, $Al(i-C_4H_9)2H$, triphenyl aluminum, trihexadecyl aluminum, ethyl aluminum sesquichloride, etc.

The molar ratio of reducing agent to transition metal salt is usually reported in terms of the molar ratio of aluminum to transition metal. Thus, regardless of the reducing agent employed, the molar ratio of aluminum to transition metal should be at least 1/1, and usually an excess is employed. Where the monoalkoxide reducing agent of Formula I is employed, the molar ratio of aluminum to transition metal may also be at least 1/1, but is preferably about 5/1 to about 30/1.

In a preferred catalyst, a third component can be utilized to improve the stability and/or enhance the catalytic activity of $AlR'_3$ type reducing agents. This third component, selected from the group consisting of Lewis bases and weak organic acids when added in controlled amounts greatly enhances the $AlR_3$ catalyst system. When hydrogenating sulfolene the addition of Lewis base is not necessary due to the fact that sulfolene and sulfolane are both Lewis bases.

Thus, the complex catalyst systems of this invention may be more specifically described as: (A) the reaction product of a transition metal salt and an organoaluminum compound of the formula $AlR_2OR$; (B) the reaction product of a transition metal salt and an organoaluminum compound of the formula $AlR'_3$; and (C) the reaction product of a transition metal salt and an organoaluminum compound of the formula $AlR'_3$ and a third component selected from the group consisting of Lewis bases and weak organic acids.

When the third component is utilized in the system denoted as (C) above, the improved activity and stability of the catalyst complex is believed to result from the conversion of free $AlR'_3$ into other species that are no longer catalyst poisons.

Additionally, it is believed that some third components, i.e. Lewis bases and weak organic acids, participate in the formation of the complex catalyst either by supplying ligands for the reduced transition metal, i.e. in the zero valence state, or by modifying the existing organometallic ligands. While the addition of the third component will stabilize all $AlR'_3$ type catalyst systems, the Lewis bases and weak organic acids serve dual functions: (1) to eliminate the possible poisoning effect of excessive amounts of $AlR'_3$, and (2) to react with the reduced transition metal complex catalyst by formation of new, superior complex catalyst systems which possess different properties, e.g. greater solubility, increased thermal stability, and the like. The catalyst systems which are pacirtularly enhanced by Lewis bases and weak organic acids are those wherein the transition metal is iron, cobalt, or nickel, particularly iron or cobalt, and most particularly cobalt. The increased activity of such systems is most notable when the anionic component of the transition metal is a chelate, and most preferably when the chelate is the acetylacetonate.

The amount of third component added depends on the amount of reducing agent utilized in preparing the catalyst system. However, when hydrogenating sulfolene the presence of sufficient amounts of Lewis base is inherent in the system. Normally, the third component is added after the contacting of the organoaluminum compound and the transition metal salt, except as noted hereinafter.

Of the third components that may be utilized in the process of this invention, Lewis bases make up a preferred class. Lewis bases are generally defined as substances which can furnish an electron pair to form a co-valent bond, i.e. an electron pair donor. Lewis bases are also excellent solvents and/or co-solvents for preparing the catalyst and may be used as such. Furthermore, Lewis bases impart an additional activity to the modified Ziegler type catalyst systems described herein. This increased activity is particularly noticeable when cobalt compounds are employed as the transition metal compound for preparing the soluble catalyst system. Preferred Lewis bases are the mono and di-functional ethers, e.g. dioxanes, tetrahydrofuran, 1,2-dimethoxyethane, anisole, diethylether, diisopropyl ether, diphenyl ether, methylethyl ether, diglyme, isopropylphenyl ether, etc. and thioethers or tetrahydrothiophene. Also sulfoxides and sulfones can be taken as Lewis bases, e.g. tetramethylenesulfoxide, sulfolene, sulfolane, etc. In addition, tertiary amines, preferably having 1 to about 10 carbon atoms, e.g. triethylamine, tripropylamine, tributyl amine and its homologous series, N-methyl morpholine, quinoline, tetrahydroquinoline, and the like; the ethers being particularly preferred.

It has also been discovered that, under the conditions of this invention, the Lewis base may be added to the organoaluminum reducing agent in at least a stoichiometric amount prior to the mixing of the reducing agent with the transition metal compound. This leads to the formation of a Lewis base-organoaluminum complex such as an etherate, which has different alkylation power than the $AlR'_3$ reducing agent. Reductions using a Lewis base-organoaluminum complex lead to catalysts with superior properties, e.g. higher hydrogenation activity. This effect upon catalyst activity in hydrogenation is quite surprising in view of some recently published literature on Ziegler type catalysts which described such procedures as being detrimental to the resulting polymerization system. This procedure not detrimental and it is also extremely advantageous in certain instances, e.g. the use of cobalt compounds to be reduced by an etherate in the preparation of highly active hydrogenation catalysts. The order of addition of the catalyst components can be varied. For instance, the transition metal salt can be dissolved in the Lewis base and subsequently be reduced by the organoaluminum compound. Or the transition metal salt dissolved in a hydrocarbon solvent can be reduced by the organoaluminum compound, followed by the addition of Lewis base.

Another third component which may be added advantageously to the Ziegler type catalyst systems is a weak organic acid. Such materials are generally characterized as having weakly ionizable hydrogen atoms. Included among these are primary, secondary and tertiary alcohols and primary and secondary amines having from about 1 to about 20 carbon atoms, and preferably 1 to about 10 carbon atoms. Particularly, preferred compounds are the tertiary alcohols in the above-mentioned carbon atom ranges, e.g. tert. butyl alcohol. Illustrative of the weak acids which may be employed are: hexanol, 2-ethyl hexanol, cyclohexanol, sec. butanol, n-butanol, octanol, cyclododecanol, glycols and the like.

The reduced metal catalyst can be easily prepared by mixing the organoaluminum reducing agent with the transition metal compound, in molar ratios that are at least stoichiometric with respect to aluminum and transition metal. The conditions of preparation are not critical and in most cases ambient conditions of temperatures and pressures are quite satisfactory. However, reductions may be carried out at temperatures in the range of about $-60°$ C. to $100°$ C., preferably $-10$ to $70°$ C. Under circumstances where the transition metal compound does not instantaneously dissolve, the reduction may be accelerated, without deleterious effect, by employing temperatures in the upper portion of the above mentioned range.

The reduction, i.e., preparation of the catalyst, and subsequent hydrogenation is preferably carried out in the presence of an inert solvent, although solvents are not essential to the success of this invention. Among the preferred solvents are: aliphatics, aromatics, partially hydrogenated aromatics, ethers, thioethers, sulfones, sulfoxides, sulfolene, sulfolane, tertiary amines, quinoline, partially hydrogenated quinolines, some alcohols, etc. Particularly preferred solvents are $C_5$-$C_{20}$ aliphatics, e.g. paraffins, such as pentane, heptane, octane, nonane, decane, and the like; $C_6$-$C_{12}$ aromatics, e.g. benzene. It should be noted that benzene may be employed as a solvent only when subsequent reaction conditions are such that the solvent will not be hydrogenated.

As mentioned earlier, sulfolene can function as reactant, solvent and Lewis base simultaneously. The hydrogenated sulfolene can function as solvent and Lewis base. In the hydrogenation of sulfolene the presence of a low boiling aromatic diluent is of advantage because of the high melting point of sulfolene and sulfolane. Therefore, the use of mixed solvent systems is frequently advantageous. Generally, the amount of sulfolane/sulfolene does vary between 5–90% w. About 0.005 moles of catalyst are utilized per mole of sulfolene or sulfolene derivatives, preferably 0.001 to 0.1 and most preferably 0.001 to 0.05.

The conversion of sulfolene to sulfolane may be measured by the pressure drop during the reaction by the temperature rise during the reaction, by gas chromatography, NMR or infra-red analysis.

Conditions for the hydrogenation of the sulfolene, or sulfolene derivatives may vary widely. Generally, the hydrogenation of sulfolene and/or its derivatives to sulfolane and/or the corresponding derivatives may take place at a temperature of $0°$ to $120°$ C., preferably 20 to $60°$ C. Pressure may vary between atmospheric and 500 p.s.i.g. and more preferably 50 to 300 p.s.i.g. The reaction may be carried out batchwise in stirred pressure vessels or continuously in vertical reactors into which the hydrogen, the feed and the catalyst solution are fed.

Following the conversion of sulfolene or its derivatives to sulfolane the catalyst must be separated from the solvent and products. The removal of the catalyst by an aqueous acid wash is difficult due to the high solubility of the sulfolane in water. Removal of the sulfolane by distillation is possible however it is difficult and expensive.

In a preferred embodiment of the instant invention it has unexpectedly been discovered that the catalyst system of the instant invention can effectively be removed from the solution which comprises solvent reactants and reaction products. This removal is effected by passing an oxygen containing gas, preferably air through the mixture and thereby converting the catalyst to a removable solid. The catalyst is altered so that it is no longer soluble in the solvent utilized for the reaction. To accomplish the alteration, any oxygen-containing gas, or pure oxygen may be utilized. For example mixtures of oxygen and carbon dioxide, or mixtures of oxygen and methane can also be utilized. It is however, preferred to use air as the oxidizing gas. Needless to say, this is dictated by availability and economics. Air should be bubbled through the mixture at atmospheric pressure at a rate of 5 to 100 ml./min., preferably 10 to 20 ml./min. for a period of about 2 to 60 minutes, preferably 5 to 20 minutes. At the end of such time the catalyst usually settles out and can be removed by conventional methods like filtration, decantation, centrifugation, percolation over a solid absorbent like clay, alumina, charcoal etc.

SPECIFIC EMBODIMENTS

Example 1

In the following examples a variety of catalysts were utilized to hydrogenate sulfolene to sulfolane. All examples were conducted at ambient temperature, and 200 p.s.i. of hydrogen falling pressure which was then repressured at 200 p.s.i. A stainless steel, 300 ml. magnetically stirred autoclave was used for these runs. The catalysts were prepared as described in U.S. 3,412,176. In a typical example 0.5 mm. nickel-acetylacetonate were dissolved in 10 ml. benzene. Subsequently 3 ml. of a 1 molar solution of tri-isobutylaluminum are added. Finally, a solution of 8.0 grams of sulfolene and 70 ml. of benzene is added. The reactant solution is then transferred under a cover of inert gas to the autoclave and the hydrogenation is started. The results are tabulated in Table I. Complete conversion was obtained within the designated reaction time. The completion of the reaction was determined by following the extent of the pressure drop, when the drop ceased the reaction was completed. After removal of the catalyst by air blowing the solution was analyzed by IR, Gas Liquid Chromatography as well as NMR and the completeness of the reaction confirmed.

TABLE I.—HYDROGENATION OF SULFOLENE WITH HOMOGENEOUS REDUCED CATALYSTS

| Run No. | Tr. metal (mm.) | Reducing agent (mm.) | Reaction time, min. |
| --- | --- | --- | --- |
| 1 | Fe (2) | $Al(i-C_4H_9)_3$ (12) | 120 |
| 2 | Ni (0.5) | $Al(i-C_4H_9)_3$ (3) | 8 |
| 3 | Co (0.5) | $Al(i-C_4H_9)_3 \times$ p-dioxane (5) | 8 |
| 4 | Co (0.5) | $(C_2H_5)_2Al$-o-$(n C_4H_9)$ (5) | 9 |
| 5 | Ni (0.5) | $Al(i-C_4H_9)_3 \times$ p-dioxane (5) | 8 |

From the above it is seen that a rapid conversion can be made of sulfolene to sulfolane utilizing the catalyst of the instant invention.

Example 2

A solution of 0.5 millimoles of nickel-acetylacetonate in 15 ml. benzene was reacted with 3 ml. of a 1 molar solution of triethylaluminum in benzene. To this solution was added to a solution of 20 g. sulfolene and 80 g. benzene. The reaction solution was hydrogenated at ambient temperature and 200 p.s.i. falling pressure. The reaction was completed (100% conversion) after 35 minutes. This was determined by the fact that the pressure stabilized. Catalyst was then removed by the following technique. Through the above solution air was bubbled at a rate of 5 ml./min. After 20 minutes the aeration was stopped and the resulting turbid solution was filtered. A clear, colorless solution was obtained. Analysis of this solution by infra red, NMR and GLC indicated that only the sulfolene was present. The solid was filtered with a standard paper filter.

What is claimed is:

1. A process for hydrogenating sulfolene and alkyl derivatives thereof which comprises: contacting, in a reaction zone, said sulfolene or alkyl derivative thereof, in the presence of an aromatic solvent, at a temperature of 20 to 60° C. and a pressure of 50 to 300 p.s.i.g., and in the presence of hydrogen, with a homogeneous catalyst, said catalyst comprising the reaction product of a transition metal salt and an organoaluminum compound having the general configuration $AlR'_3$ wherein $R'$ is independently selected from the group consisting of hydrogen, halogen and $C_1$ to $C_{20}$ hydrocarbyl radicals and at least one $R'$ is hydrocarbyl, the molar ratio of aluminum to transition metal being at least 1:1, whereby at least a portion of the sulfolene is hydrogenated and bubbling air through the reaction zone whereby the catalyst is rendered substantially insoluble in the solvent and removing said catalyst from the reaction zone.

2. A process for hydrogenating sulfolene and alkyl derivatives thereof which comprises: contacting said sulfolene or alkyl derivative thereof, with hydrogen under hydrogenation conditions, in the presence of a homogeneous catalyst, said catalyst comprising the reaction product of a transition metal salt and an organoaluminum compound selected from the group consisting of compounds having the formula $AlR'_3$ wherein $R'$ is independently selected from the group consisting of hydrogen, halogen and $C_1$ to $C_{20}$ hydrocarbyl radicals and at least one $R'$ is hydrocarbyl and $AlR_2OR$ wherein R is selected from the group consisting of $C_1$ to $C_{20}$ hydrocarbyl radicals and the molar ratio of aluminum to transition metal is at least 1:1, whereby at least a portion of the sulfolene is hydrogenated, and contacting said homogeneous catalyst with sufficient oxygen, to render the catalyst substantially insoluble.

References Cited

UNITED STATES PATENTS

| | | | |
|---|---|---|---|
| 2,578,565 | 12/1951 | Mahan et al. | 260—332.1 |
| 2,451,298 | 10/1948 | Morris et al. | 260—329 |
| 3,412,174 | 11/1968 | Kroll | 260—683.9 |

FOREIGN PATENTS

| | | |
|---|---|---|
| 1,117,318 | 6/1968 | Great Britain. |

OTHER REFERENCES

Halpern, "The Catalytic Activation of Hydrogen in Homogeneous, Heterogeneous, and Biological Systems" (Advances in Catalysis, vol. IX, Academic Press, N.Y., 1959), pp. 301 and 363–5.

HENRY R. JILES, Primary Examiner

C. M. S. JAISLE, Assistant Examiner